United States Patent
Darnell et al.

(10) Patent No.: US 7,677,538 B2
(45) Date of Patent: Mar. 16, 2010

(54) LATERAL DISPLACEMENT SHOCK ABSORBING MATERIAL

(75) Inventors: Eric Darnell, South Strafford, VT (US); William Brine, III, Hopkinton, MA (US)

(73) Assignee: Sport Helmets Inc.

( * ) Notice: Subject to any disclaimer, the term of this patent is extended or adjusted under 35 U.S.C. 154(b) by 781 days.

(21) Appl. No.: 11/229,626

(22) Filed: Sep. 20, 2005

(65) Prior Publication Data
US 2007/0083965 A1    Apr. 19, 2007

(51) Int. Cl.
*F16F 3/08* (2006.01)

(52) U.S. Cl. ........ 267/152; 267/292

(58) Field of Classification Search ........ 188/377, 188/371, 372, 373, 376; 267/145, 152, 153
See application file for complete search history.

(56) References Cited

U.S. PATENT DOCUMENTS

| | | | | |
|---|---|---|---|---|
| 170,590 A | * | 11/1875 | Pratt | 267/292 |
| 3,633,228 A | * | 1/1972 | Zysman | 267/152 |
| 3,679,166 A | * | 7/1972 | Sturhan | 248/588 |
| 4,355,792 A | * | 10/1982 | Fukuda et al. | 267/153 |
| 4,627,114 A | * | 12/1986 | Mitchell | 2/414 |
| 6,085,878 A | * | 7/2000 | Araki et al. | 188/377 |
| 6,681,907 B2 | * | 1/2004 | Le | 188/371 |
| 2005/0133324 A1 | * | 6/2005 | Soto Bailon et al. | 188/377 |

* cited by examiner

*Primary Examiner*—Robert A Siconolfi
(74) *Attorney, Agent, or Firm*—H. Jay Spiegel

(57) ABSTRACT

A lateral displacement shock absorbing material includes a material consisting of elongated tubular impact absorbing members, each having an axis of elongation. The axes of elongation are parallel to one another by virtue of lateral webbing interconnecting them together. Each of the tubular members has an outer surface made up of two frustoconical surfaces with their larger diameter ends abutting one another and their smaller diameter ends facing away from one another. Each tubular member includes a passageway defined by two frustoconical shapes with the smaller diameter ends abutting one another, and the larger diameter ends facing away from one another and defining the openings of each passageway. Upon impact, the side walls of the tubular members bulge or displace laterally to absorb impacts.

12 Claims, 1 Drawing Sheet

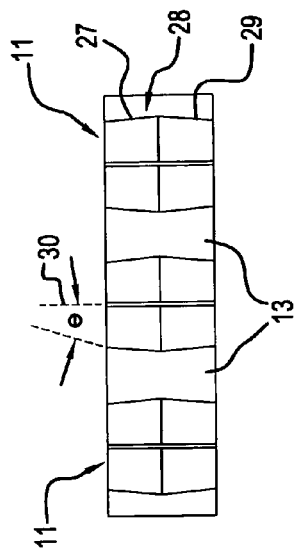
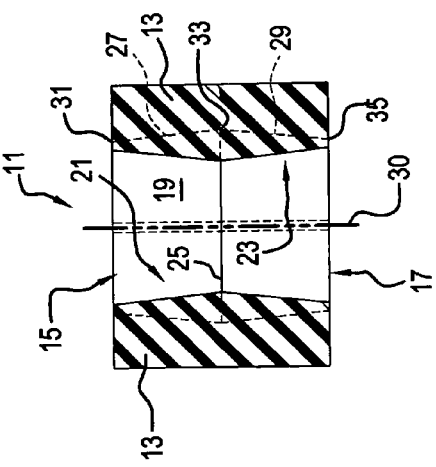
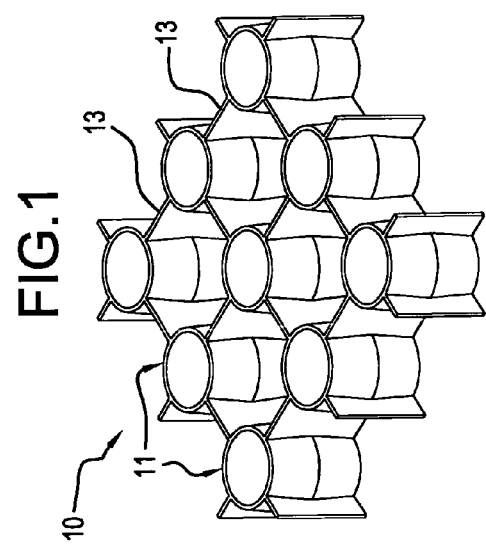
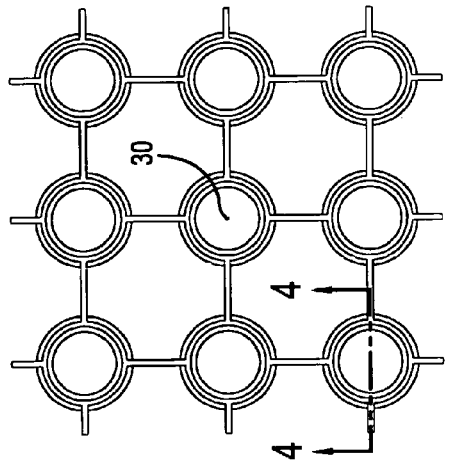

LATERAL DISPLACEMENT SHOCK ABSORBING MATERIAL

BACKGROUND OF THE INVENTION

The present invention relates to lateral displacement shock absorbing material. The present invention relates to a new way to attenuate impacts using tubular structures having non-uniform wall cross-sections placed at an angle to the direction of impact.

The objective achieved through operation of an impact attenuating material is absorption and dissipation of energy. This is accomplished when one object impacts another by slowing down the movement of the first object in a controlled manner. During the process of energy absorption, the impact attenuating material is compressed.

The degree of impact absorption achievable by an impact attenuating material is directly related to the difference between the pre-impact thickness and the thickness of the material when compressed to the maximum degree. Impact absorbing materials known in the prior art such as expanded polystyrene, expanded polypropylene, air bladders, and others bottom out when the input energy exceeds the ability of the impact absorbing material to further deform or crush. When the material bottoms out, further compression does not occur and, once bottoming out occurs, all of the further benefits of impact attenuation are gone.

For example, in the case of a material having a nominal pre-impact thickness of one inch, the material bottoms out with a thickness of 0.35 inches. Thus, only 0.65 inches of the material or 65% of it participate in the attenuation process. The remaining distance (0.35 inches) consists of the material stacking up and getting in its own way.

The science concerning use of impact attenuating materials to absorb energy is well known. Generally speaking, by varying the density and thickness of any given impact attenuating material, differing amounts of energy are capable of being absorbed. The challenge facing designers of impact attenuating products is to appropriately balance the criteria of thickness, stiffness, and energy absorbing characteristics of a product so that the product is effective structurally, cost effective, as well as commercially viable. Thus, for example, numerous impact attenuating materials might be effective in attenuating impacts on an athlete wearing a helmet. However, if the initial thickness of the impact attenuating material is too high, this requires the helmet to be made with an outer shell that is too large in dimensions to be commercially viable regardless of the price or efficiency of impact attenuation.

Generally speaking, consumers demand relatively smaller and lighter products. Thus, in an athletic helmet, it is important to conform the outer shell of the helmet as closely as possible to the head of the athlete.

Helmet designers typically attempt to design a helmet that will reduce the risk of a broad range of injuries from mild traumatic brain injury (MTBI) to death, and for use in a wide range of activities such as from baseball to lacrosse to football to motor sports. The designers attempt to anticipate the kinds of impact energies that are most likely to occur and to design the helmet to preclude or at least minimize the likelihood of serious injuries from such impacts. The challenge in designing such a helmet is, again, to manufacture the helmet in a size that most optimally conforms to the size of the head that is to be protected thereby. Helmet designs are necessarily a compromise. Impact attenuation is tuned to absorb the type of energy that is most likely to result in permanent or catastrophic injury as a result of a specific activity. Thus, for example, motorcycle helmets are made extremely stiff because they are tuned to attenuate high energy impacts that result from road crashes. By contrast, football helmets are designed "softer" because they are tuned to the energy that results from players colliding together.

To achieve the combination of attenuation of both life threatening and non-life threatening energy levels, a helmet would have to be 1.5 to 2 times the thickness of one that was designed to only protect from life threatening events. A helmet designed to protect a user from MTBI events and not intended to address higher life threatening energies would be thin, but would be seen as unacceptable to the user because it would not adequately reduce the risk of catastrophic injury or death.

In order to achieve a broad range of input energies, the impact attenuating material must be made extremely thick. If a helmet designer chooses to design a helmet intended to absorb high energy impacts, a high density material would be used. If the same designer desired to achieve low energy absorption, a low density material would be employed. If the designer intended to achieve high and low energy absorption, thick materials would be required. All of these parameters and criteria are factored together and a suitable compromise is achieved for each intended activity and the required protection from impacts that typically occur when engaged in such activity.

SUMMARY OF THE INVENTION

The present invention relates to a lateral displacement shock absorbing material. The present invention includes the following interrelated objects, aspects and features:

(1) In a first aspect, the present invention contemplates a material consisting of a plurality of elongated tubular impact absorbing members, each having an axis of elongation. The axes of elongation of the respective tubular members are parallel to one another. The tubular members are retained with their axes in parallel relation by virtue of webbing, laterally extending from the sides of each tubular member, and interconnecting them together.

(2) Each of the tubular members, in the preferred embodiment, consists of an outer surface made up of two frustoconical surfaces with their larger diameter ends abutting one another and their smaller diameter ends facing away from one another. Each tubular member includes a passageway therethrough defined by two frustoconical shapes with the smaller diameter ends abutting one another, and the larger diameter ends facing away from one another and defining the openings of each passageway. The outer surfaces of the tubular members may, if desired, be ribbed.

(3) In considering a frustoconical surface, by definition, that surface is tapered. In accordance with the teachings of the present invention, the range of taper of the outer surface of each tubular member is from 1 to 45 degrees.

(4) While the preferred embodiment of the present invention contemplates tubular members having a circular cross-section, other cross-sections are suitable for use in accordance with the teachings of the present invention. Thus, polygonal cross-sections such as square, pentagonal, hexagonal, octagonal are equally usable as the cross-sections for the tubular members as are elliptical and non-polygonal, so long as the concept of an elongated tube with a central passageway is retained.

(5) The inventive material may be made of any desired effective material such as, for example, thermoplastics including polypropylene, urethanes, and rubber, foam materials such as foamed polyethylene.

(6) In operation, upon impact, the side walls of the tubular members bulge or displace laterally to absorb impacts. The taper of the walls and the open space within the tubular members allow the energy absorbing material to displace laterally allowing a greater range of travel, thus allowing a designer to use less material to obtain equally effective attenuation as compared to traditional materials. A sheet of material according to the teachings of the present invention, with a 1/16" side wall thickness is able to crush to a vertical thickness of 1/8", giving active attenuation from full vertical thickness to 1/8" crushed thickness.

(7) When the present invention is manufactured using resilient materials, the invention exhibits multi-impact characteristics. The side wall shape and design along with material selection cause the material to absorb and dampen the impact rather than acting like a spring and rebounding the energy. Dampened rebound is important so that the material does not act like a bouncing ball and just return the energy to the object being shielded from inputted energy.

(8) The fact that each tubular member is centrally open facilitates enhanced ventilation of an athletic helmet from outside the helmet to the location of the user's head. Airflow through the tubular members easily occurs to enhance ventilation and keep the interior of the helmet relatively cooler.

(9) In the preferred embodiment of the present invention, the degree of taper of the inner and outer surfaces of the tubular members consist of mirror images of one another. However, if desired, the tapers of the inner and outer surfaces of the tubular member may differ.

(10) The shock absorbing material may be manufactured using injection molding, casting, compression molding, drape molding or may be machined from a wide variety of thermoplastic, rubber, and foamed materials.

Accordingly, it is a first object of the present invention to provide lateral displacement shock absorbing material.

It is a further object of the present invention to provide such material including a multiplicity of tubular members having axes of elongation aligned with one another.

It is a further object of the present invention to provide such a material in which the axes of the tubular members are maintained in alignment by virtue of webbing material integrally formed with the tubular members.

It is a still further object of the present invention to provide such a material that enhances the degree of energy absorption of a helmet structure over all known energy absorbing materials in use for helmets and other headgear.

These and other objects, aspects and features of the present invention will be better understood from the following detailed description of the preferred embodiments when read in conjunction with the appended drawing figures.

BRIEF DESCRIPTION OF THE DRAWINGS

FIG. 1 shows a perspective view of a preferred embodiment of the present invention.

FIG. 2 shows a side view of the embodiment of FIG. 1.

FIG. 3 shows a top view of the embodiment of FIG. 1.

FIG. 4 shows a cross-sectional view along the line A-A of FIG. 3.

SPECIFIC DESCRIPTION OF THE PREFERRED EMBODIMENTS

With reference first to FIG. 1, a preferred embodiment of the present invention is generally designated by the reference numeral 10, and is seen to include a plurality of tubular members 11 interconnected with webs or webbing 13 comprising means for maintaining the axes of elongation 30 of the members 11 substantially parallel. In the example shown, the tubular members are arranged in a square matrix with even spacing between one tubular member and tubular members to the sides thereof. Thus, in the example shown, one tubular member is surrounded by four adjacent tubular members at 90 degree spacing about the circumference of the centrally located tubular member 11, with each of these members being interconnected through the webbing 13. This is also shown with particular reference to FIGS. 2 and 3. Of course, any means may be employed to maintain tubular members in spaced parallel relation.

With reference to FIGS. 2 and 4, the specific details of each tubular member 11 become more evident. As seen in FIG. 4, a typical tubular member 11 includes a top opening 15, a bottom opening 17, and a passageway 19 extending therethrough. The passageway 19 consists of a first surface 21 and a second surface 23. Each of the surfaces 21 and 23 consists of a frustoconical shape. As shown in FIG. 4, the surface 21 is a frustoconical shape having its larger diameter coinciding with the upper opening or first end 15 and its smaller diameter defined by the line 25. The line 25 also defines the smaller diameter portion of the frustoconical surface 23 that terminates at a larger diameter portion defined as the lower opening or second end 17. Thus, the passageway 19 is defined by two frustoconical surfaces abutting one another at their respective smaller diameter openings.

By contrast, with reference to FIGS. 2 and 4, the tubular members 11 have outer surfaces having varying cross-sectional dimensions from the first end to the second end consisting of a first outer surface 27 and a second outer surface 29. The outer surfaces 27 and 29 each consist of frustoconical surfaces. The surface 27 comprises a frustoconical surface including an upper termination 31 defining a relatively smaller diameter surface and a lower termination 33 defining a relatively larger diameter surface. The termination 33 also defines the upper termination of the lower surface 29 with the upper termination 33 defining the larger diameter portion of the frustoconical surface 29. The lower termination of the surface 29 at 35 defines the relatively smaller diameter portion of the surface 29. Thus, the outer surface 28 of the tubular member 11 consists of two frustoconical surfaces 27 and 29 with their relatively larger diameter portions abutting one another at a central location along the axis of elongation of the tubular member 11, which axis is designated by the reference numeral 30 in FIGS. 3 and 4.

In FIG. 2, the angle θ is shown and consists of the angle between the surface 29 and the axis of elongation 30. In the preferred embodiment of the present invention, the angle θ may range from 1 to 45 degrees.

In the preferred embodiments of the present invention, the inventive tubular members 11 and webbing 13 are made of any suitable material such as thermoplastic, for example, polypropylene, urethanes, and rubber. The inventive device 10 may be made in an injection molding process, in a pressure molding process, by casting, drape molding or machining.

The cross-section of the tubular members is shown as circular in the Figures. However, if desired, that cross-section may be polygonal, including triangular, square, pentagonal, hexagonal and octagonal as several examples.

The taper of the side walls 27, 29, 21 and 23 allows the inventive material to have a variable tunable crush ability. Use of a double taper, inside taper, outside taper or any combination thereof may be used depending upon the particular situation. The example shown includes both inner and outer double tapers. In the prior art, multi-impact attenuation products typically exhibit non-uniform resistance to crush, require a high load to start the crush process, and commencement of the crush process is typically followed by a non-uniform collapse. Applicants have found that the present invention as contemplated allows for a softer initial resistance followed by an increase in crush resistance as the material is compressed, thereby exhibiting a somewhat uniform resistance throughout a wide range of crushing activity.

If desired, the inside walls of the tubular members may be slightly tapered as shown in the Figures to allow the materials to roll inside as they collapse, thereby giving a shorter, completely collapsed height to the product. In use, the tubular members absorb and dampen impact rather than acting like springs and do not rebound energy as is the case in spring-like materials. Through dampened rebound characteristics, the material does not act like a bouncing ball which just returns energy from the impacting object.

Enhanced consistency is achieved through the preferred manner of manufacture, namely, injection molding. The present invention with its tubular members open completely therethrough enhances ventilation of a helmet in which they are installed. Airflow through the tubular members and past the webbing is virtually unrestricted.

Through changes in the density and durometer of the material, impact absorbing characteristics can appropriately be modified. In the preferred embodiments of the present invention, the material exhibits a durometer in the range of 20 to 120 on the Shore A hardness scale. By shortening the widths of the webbing 13 and thereby locating the tubular members 11 closer together, enhanced impact absorption characteristics result. Applicants have found that as a result of use of the teachings of the present invention, impact absorption can be enhanced by a factor of 50 to 75% over known impact absorbing materials.

In the preferred embodiments of the present invention, the elasticity of the materials from which the tubular members are made may range between 5 and 2,000%. Applicants have found that use of multi-tapered walls such as those shown in FIGS. 1-4 results in a cascading impact absorbing effect. That is, when the tubular members are compressed, a second taper starts to bulge after a first taper has been compressed to the point where it starts to stiffen, and this process continues on through third and fourth tapers in a cascading order. While the example shown includes inner and outer tapered surfaces that are mirror images of one another, as best seen with reference to FIG. 4, it is not necessary that the mirror image configuration shown in FIG. 4 be employed.

The webbing 13 does not play a significant role in impact attenuation. The webbing 13 is merely included to hold the tubular members 11 in place before and after impacts and in the proper orientation with the respective axes 30 substantially aligned with one another in parallel relation. Prevention of interference of the webbing 13 with impact attenuation may be accomplished by attaching web structures to one end of a tubular member 11 only, by attaching the webbing 13 at both ends of a tubular member 11, by attaching the webbing 13 the full length from the top to the bottom of the tubular member or any fraction of that length, by making the webbing 13 of a multi-part construction, or by making the webbing convoluted in shape such as, for example, with a S-shaped cross-section. Of course, one important factor is to design the webbing and tubular members so that the entire assembly may be molded in a substantially linear movement of tooling halves to minimize the cost of tooling.

As such, an invention has been disclosed in terms of preferred embodiments thereof which fulfill each and every one of the objects of the invention as set forth hereinabove, and provide a new and useful lateral displacement shock absorbing material of great novelty and utility.

Of course, various changes, modifications and alterations in the teachings of the present invention may be contemplated by those of ordinary skill in the art without departing from the intended spirit and scope thereof.

As such, it is intended that the present invention only be limited by the terms of the appended claims.

The invention claimed is:

1. A shock absorbing material, comprising:
    a) a plurality of tubular members spaced apart, each tubular member including:
        i) an axis of elongation;
        ii) an internal passageway having an inner surface and extending through a said tubular member from a first end of said tubular member to a second end thereof, said inner surface comprising two abutting frustoconical surfaces with relatively smaller first terminations abutting;
        iii) an outer surface having varying cross-sectional dimensions from said first end to said second end, said outer surface comprising two abutting frustoconical surfaces with relatively larger diameter first terminations abutting one another; and
    b) means for maintaining said axes of elongation of said tubular members in substantially parallel alignment.

2. The material of claim 1, wherein said frustoconical surfaces of said outer surface have relatively smaller diameter second terminations coinciding with said first and second ends, respectively.

3. The material of claim 1, wherein said frustoconical surfaces of said internal passageway have relatively larger diameter second terminations coinciding with said first and second ends, respectively.

4. The material of claim 1, wherein said means for maintaining comprises webbing laterally interconnecting adjacent tubular members.

5. The material of claim 4, wherein each tubular member has a plurality of webbings extending laterally therefrom.

6. The material of claim 4, comprising at least five tubular members including a central tubular member, four peripheral tubular members and webbing interconnecting said central tubular member to each peripheral tubular member.

7. The material of claim 1, made of molded plastic.

8. The material of claim 1, made of rubber.

9. The material of claim 1, wherein said frustoconical surfaces define with an axis of elongation a taper of 1-45°.

10. A shock absorbing material, comprising:
    a) a plurality of tubular members spaced apart, each tubular member including:
        i) an axis of elongation;
        ii) an internal passageway having an inner surface and extending through a said tubular member from a first end of said tubular member to a second end thereof, said inner surface comprising two abutting frustoconical surfaces with relatively smaller first terminations abutting;
        iii) an outer surface extending from said first end to said second end; and
    b) means for maintaining said axes of elongation of said tubular members in substantially parallel alignment, said means for maintaining comprising webbing laterally interconnecting adjacent tubular members.

11. The material of claim 10, wherein said two abutting frustoconical surfaces have relatively larger diameter terminations coinciding with said first and second ends, respectively.

12. The material of claim 10, wherein each tubular member has a plurality of webbing extending laterally therefrom.

* * * * *